(12) United States Patent
Salama et al.

(10) Patent No.: US 7,197,549 B1
(45) Date of Patent: Mar. 27, 2007

(54) ON-DEMAND ADDRESS POOLS

(75) Inventors: Hussein F. Salama, Sunnyvale, CA (US); Purnam Anil Sheth, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 09/874,520

(22) Filed: Jun. 4, 2001

(51) Int. Cl.
  *G06F 15/173* (2006.01)
(52) U.S. Cl. .................. 709/223; 703/220; 703/226; 703/228; 710/4
(58) Field of Classification Search ........ 709/220–223, 709/226–228; 710/4
  See application file for complete search history.

(56) References Cited

U.S. PATENT DOCUMENTS

| | | | |
|---|---|---|---|
| 5,241,594 A | 8/1993 | Kung | 380/4 |
| 5,367,635 A | 11/1994 | Bauer et al. | 395/200 |
| 5,561,703 A | 10/1996 | Arledge et al. | 379/57 |
| 5,581,478 A | 12/1996 | Cruse et al. | 364/505 |
| 5,592,538 A | 1/1997 | Kosowsky et al. | 379/93 |
| 5,610,910 A | 3/1997 | Focsaneanu et al. | 370/351 |
| 5,621,721 A | 4/1997 | Vatuone | 370/16 |
| 5,655,077 A | 8/1997 | Jones et al. | 395/187.01 |
| 5,671,354 A | 9/1997 | Ito et al. | 395/187.01 |
| 5,684,950 A | 11/1997 | Dare et al. | 395/187.01 |
| 5,699,521 A | 12/1997 | Iizuka et al. | 395/200.15 |
| 5,715,394 A | 2/1998 | Jabs | 395/200.11 |
| 5,717,604 A | 2/1998 | Wiggins | 364/514 |
| 5,734,654 A | 3/1998 | Shirai et al. | 370/396 |
| 5,745,556 A | 4/1998 | Ronen | 379/127 |
| 5,764,736 A | 6/1998 | Shachar et al. | 379/93.09 |
| 5,764,756 A | 6/1998 | Onweller | 379/242 |
| 5,768,521 A | 6/1998 | Dedrick | 395/200.54 |

(Continued)

FOREIGN PATENT DOCUMENTS

NO 9904240 A * 3/2001

(Continued)

OTHER PUBLICATIONS

Active Software, Inc., "Active Software's Integration System", printed from http://www.activesw.com/products/products.html, on Jul. 24, 1998.

(Continued)

*Primary Examiner*—Kim Huynh
*Assistant Examiner*—Eron Sorrell
(74) *Attorney, Agent, or Firm*—Thelen Reid Brown Raysman & Steiner LLP; John P. Schaub

(57) ABSTRACT

A method for on-demand management of Internet Protocol (IP) address pools includes allocating an unused IP address from a local IP address pool designated for a remote domain if a request to connect to the remote domain is received and deallocating an IP address back to the local IP address pool if the IP address is unused. The method also includes apportioning one or more of the at least one subnet between the global IP address pool and the local IP address pool based upon utilization of the local IP address pool. The local IP address pool includes one or more of at least one subnet obtained from a global IP address pool and each subnet specifies a contiguous set of one or more IP addresses.

54 Claims, 14 Drawing Sheets

U.S. PATENT DOCUMENTS

| | | | |
|---|---|---|---|
| 5,778,182 A | 7/1998 | Cathey et al. | 395/200.49 |
| 5,812,529 A | 9/1998 | Czarnik et al. | 370/245 |
| 5,835,720 A | 11/1998 | Nelson et al. | 395/200.54 |
| 5,835,725 A | 11/1998 | Chiang et al. | 395/200.58 |
| 5,835,727 A | 11/1998 | Wong et al. | 395/200.68 |
| 5,838,682 A | 11/1998 | Dekelbaum et al. | 370/401 |
| 5,838,683 A | 11/1998 | Corley et al. | 370/408 |
| 5,838,994 A | 11/1998 | Valizadeh | 395/876 |
| 5,845,070 A | 12/1998 | Ikudome | 395/187.01 |
| 5,852,812 A | 12/1998 | Reeder | 705/39 |
| 5,854,901 A | 12/1998 | Cole et al. | 395/200.75 |
| 5,867,495 A | 2/1999 | Elliott et al. | 370/352 |
| 5,889,774 A | 3/1999 | Mirashrafi et al. | 370/352 |
| 5,898,780 A | 4/1999 | Liu et al. | 380/25 |
| 5,905,736 A | 5/1999 | Ronen et al. | 370/546 |
| 5,913,037 A | 6/1999 | Spofford et al. | 395/200.56 |
| 5,918,016 A | 6/1999 | Brewer et al. | 395/200.5 |
| 5,922,051 A | 7/1999 | Sidey | 209/223 |
| 5,926,458 A | 7/1999 | Yin | 370/230 |
| 5,944,824 A | 8/1999 | He | 713/201 |
| 5,968,116 A | 10/1999 | Day, II et al. | 709/202 |
| 5,970,477 A | 10/1999 | Roden | 705/32 |
| 5,974,453 A | 10/1999 | Andersen et al. | 709/220 |
| 5,991,828 A | 11/1999 | Horie et al. | 710/8 |
| 6,009,103 A | 12/1999 | Woundy | 370/401 |
| 6,011,910 A | 1/2000 | Chau et al. | 395/200.59 |
| 6,018,619 A | 1/2000 | Allard et al. | 395/200.54 |
| 6,021,429 A | 2/2000 | Danknick | 709/202 |
| 6,026,087 A | 2/2000 | Mirashrafi et al. | 370/389 |
| 6,026,441 A | 2/2000 | Ronen | 709/227 |
| 6,035,281 A | 3/2000 | Crosskey et al. | 705/14 |
| 6,052,725 A | 4/2000 | McCann et al. | 709/223 |
| 6,055,236 A | 4/2000 | Nessett et al. | 370/389 |
| 6,091,951 A | 7/2000 | Sturniolo et al. | 455/432 |
| 6,092,196 A | 7/2000 | Reiche | 713/200 |
| 6,119,160 A | 9/2000 | Zhang et al. | 709/224 |
| 6,141,687 A | 10/2000 | Blair | 709/225 |
| 6,178,455 B1 | 1/2001 | Schutte et al. | 709/228 |
| 6,249,813 B1 | 6/2001 | Campion et al. | 709/222 |
| 6,266,523 B1 | 7/2001 | Cook et al. | 455/403 |
| 6,282,575 B1 * | 8/2001 | Lin et al. | 709/244 |
| 6,381,650 B1 | 4/2002 | Peacock | 709/245 |
| 6,513,066 B1 | 1/2003 | Hutton et al. | |
| 6,564,216 B2 | 5/2003 | Waters | 707/10 |
| 6,577,628 B1 * | 6/2003 | Hejza | 370/392 |
| 6,587,455 B1 | 7/2003 | Ray et al. | 370/352 |
| 6,618,757 B1 | 9/2003 | Babbitt et al. | 709/226 |
| 6,763,012 B1 | 7/2004 | Lord et al. | 370/338 |
| 6,795,709 B2 | 9/2004 | Agrawal et al. | 455/452.1 |
| 6,799,204 B1 * | 9/2004 | Baba et al. | 709/220 |
| 2001/0025312 A1 | 9/2001 | Obata | 709/226 |
| 2001/0044893 A1 | 11/2001 | Skemer | 713/153 |
| 2002/0013847 A1 | 1/2002 | Fisher et al. | 709/226 |
| 2002/0138614 A1 * | 9/2002 | Hall | 709/225 |
| 2002/0155827 A1 * | 10/2002 | Agrawl et al. | 455/414 |
| 2003/0115345 A1 | 6/2003 | Chien et al. | 709/229 |

FOREIGN PATENT DOCUMENTS

| | | |
|---|---|---|
| WO | 97/13352 | 4/1997 |
| WO | 97/13382 | 4/1997 |
| WO | 99/53408 | 10/1999 |

OTHER PUBLICATIONS

Alexander, S., "DHCP Optios and BOOTP Vendor Extensions," Network Working Group, RFC 1533, Oct. 1993.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Cisco Systems, Inc., "Cisco DNS/DHCP Manager V.I.1", printed from http://www.combinet.com/warp/public/751/dnsmg/dnsmg_ds.htm, on Sep. 10, 1998, 4 pages.

Droms, R., "Dynamic Host Configuration Protocol," Networking Group, RFC 1531, Oct. 1993.

IBM, "IBM introduces new subscriber management system for Internet service providers", Dec. 2, 1998, IBM News, p. 1.

Networking Registrar, "Regain Confidence and Control Over Your IP Address Infrastructure", American Internet Corporation, Bedford, MA.

Network Registrar, "Hot Products & Solutions—IP Address Management: A White Paper", American Internet Corporation, Bedford, MA, printed from http://www.american.com/ip-mgmt.html, on Jul. 24, 1998.

"Network Address Translation Information", printed from http://www.uq.edu.au/~gadmacka/content/natinformation.htm, on Sep. 19, 1998.

Rigney, et al., "Remote Authentication Dial In User Service (RADIUS)", Network Working Group, RFC 2138, Apr. 1997, pp. 1-57.

"Three Ways to Manage IP Addresses", PC Magazine: IP Address Management, printed from htto://www.zdnet.com/pcmag/features/ipmanage/ip-s2.htm, on Sep. 10, 1998.

* cited by examiner

ON-DEMAND ADDRESS POOLS

CROSS REFERENCE TO RELATED APPLICATIONS

This application is related to the following:

U.S. patent application Ser. No. 09/765,981, filed Jan. 19, 2001 in the name of inventor Purnam Sheth, entitled "IP Pool Management Utilizing an IP Pool MIB", commonly assigned herewith.

FIELD OF THE INVENTION

The present invention relates to the field of data communications. More particularly, the present invention relates to a system and method for on-demand address pools.

BACKGROUND OF THE INVENTION

The growth of the Internet appears to be exponential. Tens of thousands of networks are now connected to the Internet, and the number is close to doubling every year. Unfortunately, however, Internet Protocol (IP) addresses are not infinite and it is rather expensive to procure more IP addresses. With the increase in the number of users of the Internet, Telcos (Telecommunication companies) and ISPs (Internet Service Providers) are faced with an increasing shortage of IP addresses.

Each service to which a user may be connected has an associated IP address space. That is, a certain range of addresses may address that space. The range may be contiguous, discontiguous, or a combination of both. For example, Corp A may have an intranet service having all IP addresses which start with "10.1"—this may be denoted "10.1.x.x" where x can be any value. It may also be denoted "10.1.0.0; 255.255.0.0" where "10.1.0.0" represents the IP address and "255.255.0.0" represents the subnet mask. Those of skill in the art will recognize that a 255 in the subnet mask field represents a binary 1111 1111 and amounts to a requirement that the corresponding field of the IP address must match bit for bit in order to achieve a match. On the other hand, a 0 in the subnet mask field represents a binary 0000 0000 and amounts to no requirement for any match. For example, a service having an address space of "0.0.0.0; 0.0.0.0" represents the Internet, i.e., all IP addresses are within this space. Note that since the subnet mask is 0.0.0.0 the IP address could be set to any value and it would yield the same result.

The Dynamic Host Configuration Protocol (DHCP) has been developed to provide an automated assignment of IP addresses and to help solve the shortage of IP addresses. Conventional DHCP operation is as follows: When a DHCP client computer attempts an Internet connection, it broadcasts a DHCP request asking for any DHCP server on the network to provide it with an IP address and configuration parameters. A DHCP server on the network that is authorized to configure this client will offer an IP address by sending a reply to the client. Upon receiving this offer, the client may decide to accept it or wait for additional offers from other DHCP servers on the network. At the end, the client chooses and accepts one offer, and the chosen DHCP server sends an acknowledgement with the offered IP address having an associated "lease" time (and any other configuration parameters the client might have requested). During the lifetime of the lease, the client will repeatedly ask the server to renew. If the client chooses not to renew or if the client machine is shut down, the lease eventually expires. Once the lease expires, the IP address can be "recycled" and given to another machine.

The RADIUS (Remote Authentication Dial In User Service) protocol is typically used to authenticate a user and to associate the user with a remote domain and associated routing table. Like DHCP, RADIUS can also be used to assign an IP address to a remote user.

Point-to-Point Protocol (PPP) sessions are typically terminated on a home gateway, at a remote domain such as a virtual private network (VPN) and the owner of the remote domain is responsible for address assignment. In this case, a Network Access Server (NAS) is configured so as to implement DHCP-like functionality with IP address pools so as to dynamically allocate IP addresses. The NAS distributes IP addresses to users (end-users of the Telco or ISP) when the users log-in. The NAS also revokes IP addresses when the users log-out, making those IP addresses available to other users.

The network edge is the point where customer traffic enters a service provider's network. Traffic can arrive at the edge via access technologies including dial, IP, ATM, Frame Relay, leased line, wireless, Digital Subscriber Line (xDSL) and cable. An edge switch or edge router aggregates traffic from all or some of these access interfaces and forwards packets over a multiplexed packet network core.

Service providers have begun handling management of IP addresses for owners of remote domains. In these cases, PPP sessions are terminated at the service provider's premises on an edge router. The owner of the remote domain provides the service provider with a pool of IP addresses to manage on behalf of the remote domain. An edge router of the service provider assigns IP addresses to remote users (users of the remote domain) as needed. Whenever an edge router assigns an IP address to a remote user, it must insert a route to that user in a routing table designated for the remote domain. This update must be propagated to corresponding routing tables in each edge router in the network. This is explained below in more detail with reference to FIG. 1.

FIG. 1 is a flow diagram that illustrates a typical method for allocating IP addresses. At 100, a service provider receives a pool of IP addresses from an owner of a remote domain such as a virtual private network. At 105, each pool of IP addresses is divided into per-remote domain local IP address pools on each edge router that is configured to accept PPP sessions from remote users of the remote domain. At 110, a determination is made regarding whether an IP address from a remote user has been received. If an IP address from a remote user has been received, at 115 an unused IP address from a local IP address pool designated for the remote domain being connected to is assigned to the remote user. At 120, a route to the remote user is inserted into the corresponding edge router routing table. If an IP address from a remote user has not been received, at 125 a determination is made regarding whether an IP address has been returned. If an IP address has been returned, the IP address is returned back to its designated IP address pool at 130 and the route to the remote user is removed from the corresponding routing table at 135.

However, maintaining routing information for each IP address is expensive with respect to network bandwidth consumption because each time an address is added or removed, the event must be broadcast so that other network entities know which edge router is handling the address. Moreover, this problem of bandwidth consumption increases and becomes more acute during peak use hours.

Additionally, the routing tables grow larger and more difficult to manage as the size of the network grows.

An improvement is made possible by statically configuring local IP address pools on each edge router. Each edge router includes at least one local IP address pool designated for a remote domain. Each edge router also includes a routing table for each remote domain supported by the edge router. Local IP address pools are divided into groups of contiguous IP addresses or subnets. Summarized routes corresponding to all subnets in an address pool are inserted into the edge router routing table associated with the pool. Local IP address pools allow relatively efficient route summarization because fewer routing table updates are required. This explained below in more detail with reference to FIG. 2.

FIG. 2 is a flow diagram that illustrates an improved method for allocating IP addresses using statically configured local IP address pools. At 200, a service provider receives a pool of IP addresses from a remote domain to manage on behalf of the remote domain. At 205, each pool of IP addresses is divided into per-remote domain local IP address pools on each edge router that is configured to accept PPP sessions from remote users of the remote domain. At 210, summarized routes corresponding to subnets in the address pool are statically inserted into the routing table associated with the pool. At 215, a determination is made regarding whether an IP address request has been received from a remote user. If a an IP address request has been received, at 220 an unused IP address is assigned from a local IP address pool designated for the remote domain being connected to. If an IP address has not been received, at 225 a determination is made regarding whether an IP address has been returned. If an IP address has been returned, at 230 the IP address is returned to its designated IP address pool.

Unfortunately, statically configured local IP address pools have their own disadvantages. It is possible to overutilize IP addresses for one edge router-remote domain combination while simultaneously underutilizing IP addresses for another edge router configured to accept connections for the same remote domain. For example, suppose edge router 1 and edge router 2 are configured with 10 IP addresses each for connections to a particular remote domain. Once edge router 1 allocates all 10 IP addresses, further requests to edge router 1 from remote users of the remote domain will result in denial of service, even if edge router 2 has allocated only 2 of its 10 IP addresses.

As mentioned above, both the DHCP and RADIUS protocols can be used to assign IP addresses. However, these protocols assign a host address to a remote user. The edge router can be configured to autosummarize the host routes before redistributing them. Unfortunately, route summarization is inefficient in this case because remote users log on and off indeterminately, making it difficult to have a contiguous set of IP addresses that can be summarized. Furthermore, it takes time to propagate a newly inserted route to all edge routers. A remote user has limited connectivity during this period. Another disadvantage is that updates must be sent to each edge router whenever a remote user logs on or off.

What is needed is a solution that provides dynamic and relatively efficient allocation of remote domain IP addresses between one or more edge routers. A further need exists for such a solution that uses open and well-understood standards.

BRIEF DESCRIPTION OF THE INVENTION

A method for on-demand management of Internet Protocol (IP) address pools includes allocating an unused IP address from a local IP address pool designated for a remote domain if a request to connect to the remote domain is received and deallocating an IP address back to the local IP address pool if the IP address is unused. The method also includes apportioning one or more of the at least one subnet between the global IP address pool and the local IP address pool based upon utilization of the local IP address pool. The local IP address pool includes one or more of at least one subnet obtained from a global IP address pool and each subnet specifies a contiguous set of one or more IP addresses. An apparatus for on-demand management of Internet Protocol (IP) address pools includes an allocator to allocate an unused IP address from a local IP address pool designated for a remote domain if a request to connect to the remote domain is received and a deallocator to deallocate an IP address back to the local IP address pool if the IP address is unused. The apparatus also includes a monitor to apportion one or more of the at least one subnet between the global IP address pool and the local IP address pool based upon utilization of the local IP address pool.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Figure 1:
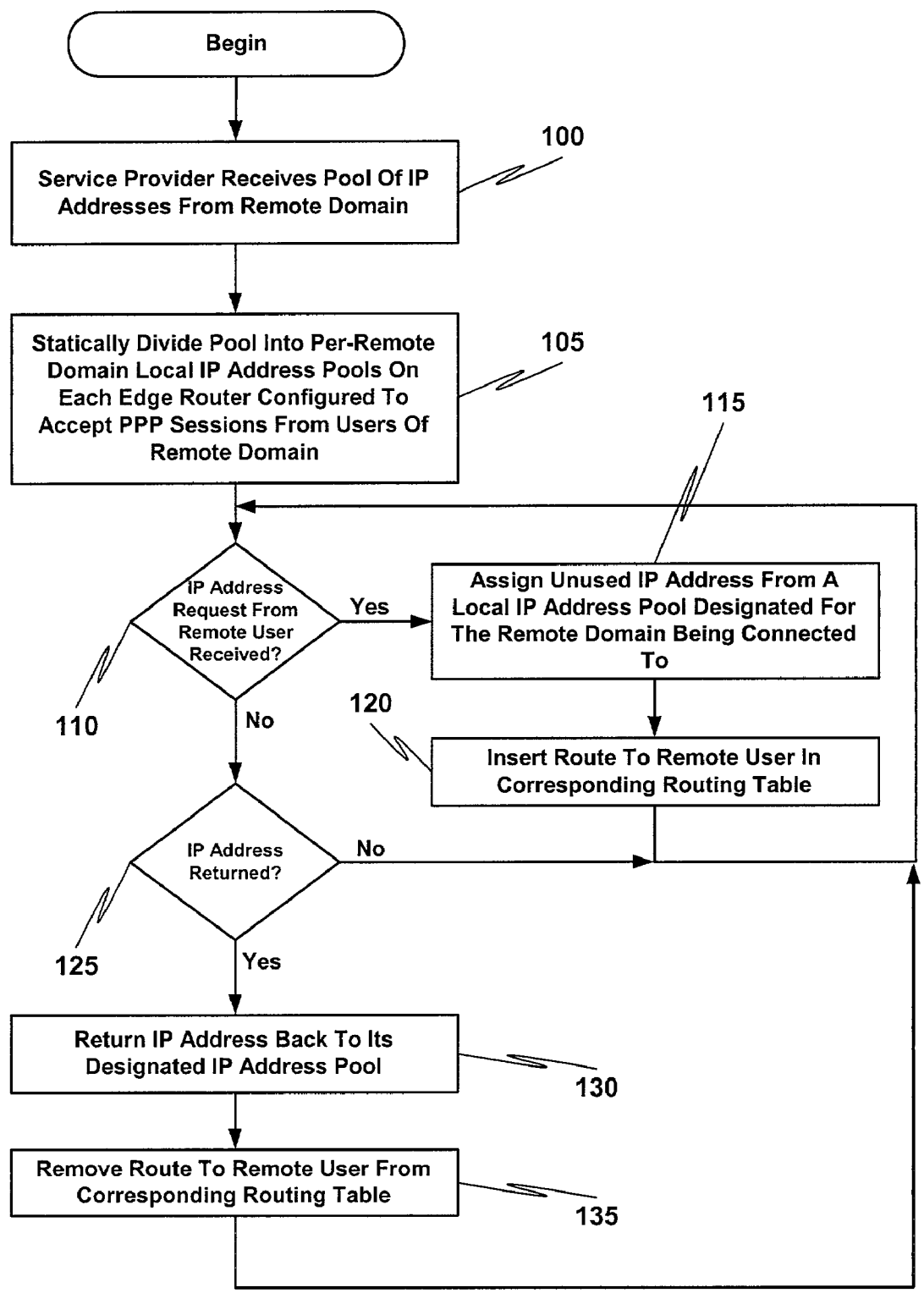
FIG. 1 is a flow diagram that illustrates a method for managing remote domain IP address pools.
Figure 2:
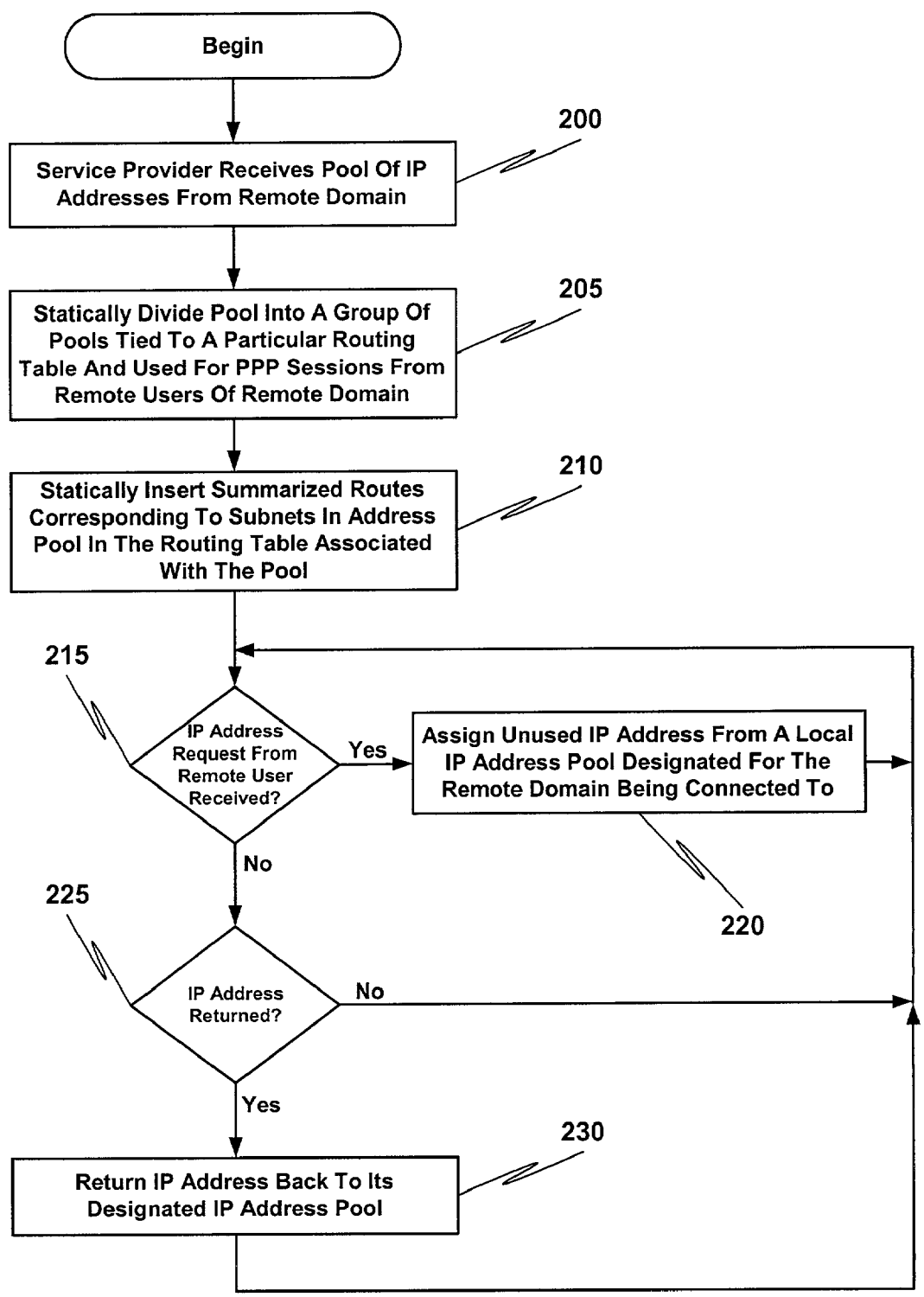
FIG. 2 is a flow diagram that illustrates a method for managing remote domain IP address pools that includes route summarization using statically configured local IP address pools.

Embodiments of the present invention are described herein in the context of a system and method for on-demand address pools. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+(Tools & Algorithms for Construction and Analysis of Systems) or DIAMETER can be used as acceptable authentication communications links between the various communications devices that encompass the data communication network and still be within the inventive concepts disclosed herein. RADIUS, TACAS+, and DIAMETER are protocols known by those of ordinary skill in the art and thus, will not be further discussed other than in the context of the present invention in order to avoid over-complicating the disclosure.

According to embodiments of the present invention, a global IP address pool maintains a pool or block of IP addresses for one or more remote domains. Each pool is divided into subnets and these subnets are assigned to edge routers when requested. An edge router includes at least one local IP address pool configured for at least one remote domain supported by the edge router. The edge router makes subnet requests and releases subnets based upon local IP address pool utilization. Dynamic allocation of subnets between local IP address pools allows relatively efficient route summarization as well as relatively efficient utilization of a remote domain's IP address space.

Figure 3:
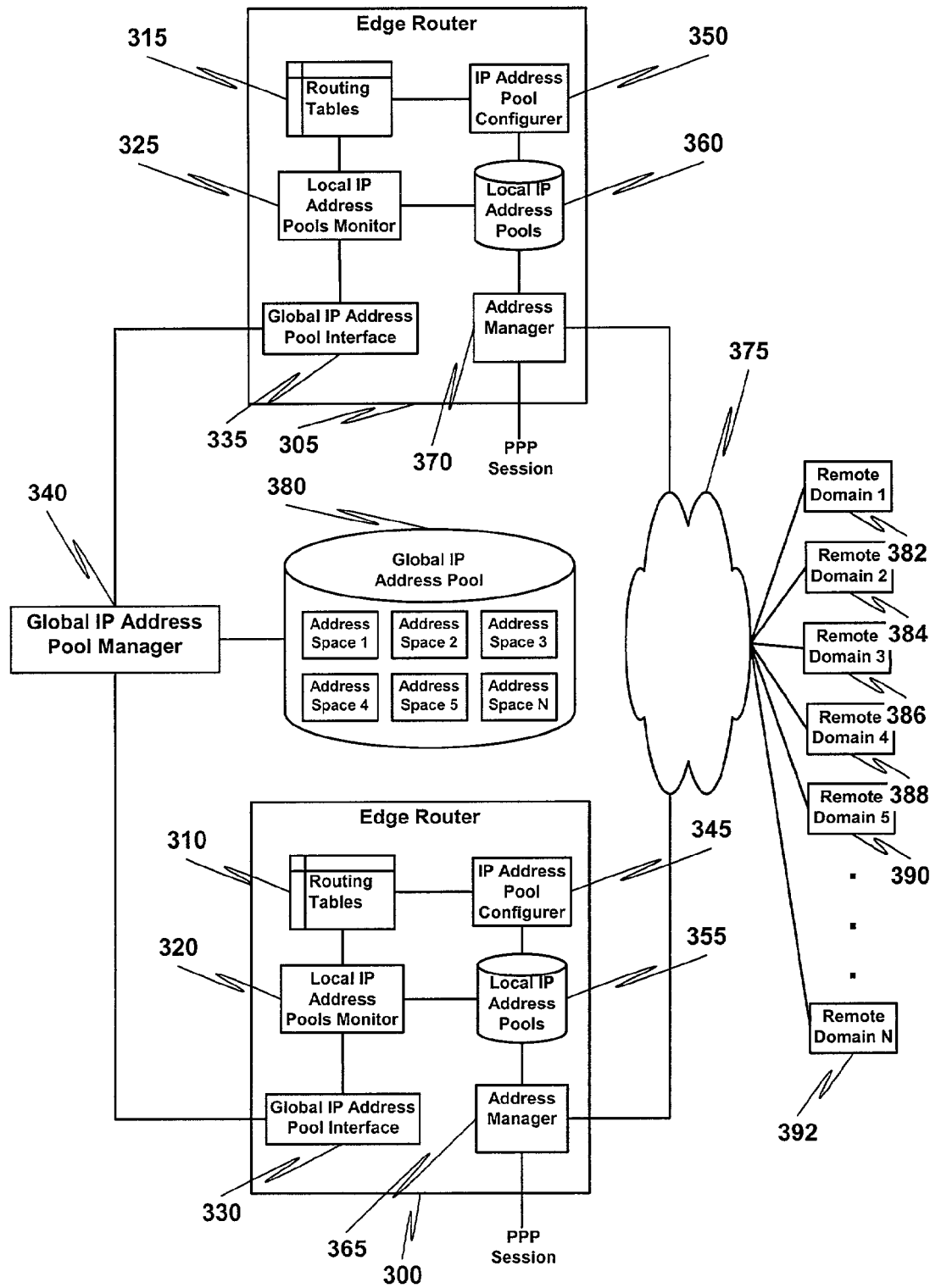
FIG. 3 is a block diagram that illustrates an apparatus for on-demand IP address management in accordance with one embodiment of the present invention.

Turning now to FIG. 3, a block diagram that illustrates an apparatus for on-demand IP address management in accordance with one embodiment of the present invention is presented. FIG. 3 includes edge router 300 and edge router 305. Each edge router (300, 305) includes a routing table storage (310, 315) coupled to a local IP address pools monitor (320, 325) and a global IP address pool interface (330, 335) coupled to the local IP address pools monitor (320, 325) and a global IP address pool manager 340. Each edge router (300, 305) also includes an IP address pool configurer (345, 350) coupled to the routing table storage (310, 315) and to a local IP address pools storage (345, 350). Local IP address pools storage (345, 350) is coupled to the local IP address pools monitor (320, 325) and to a local IP address manager (365, 370). Local IP address manager (365, 370) is coupled to network 375. Global IP address pool manager 340 is coupled to global IP address pool 380, which includes global per-remote domain IP address pool information.

One or more of remote domains 382–392 provide a service provider with a set of IP addresses for the service provider to manage on behalf of the remote domains. The number of remote domains illustrated is not intended to be in any way limiting. The service provider stores information about these IP addresses in global IP address pool 380. The service provider may also configure edge router (300, 305) with one or more subnets for one or more remote domains.

In operation, edge router (300, 305) receives a PPP connection request and allocates an IP address from the local IP address pool designated for the remote domain being connected to. The IP address is returned to the local IP address pool when the PPP session ends. Local IP address pools monitor (320, 325) monitors local IP address pool utilization. Local IP address pools monitor (320, 325) issues a request for an additional subnet when local IP address pool utilization exceeds a high watermark. Local IP address pools monitor (320, 325) also releases a subnet when local IP address pool utilization drops below a low watermark.

Figure 4:
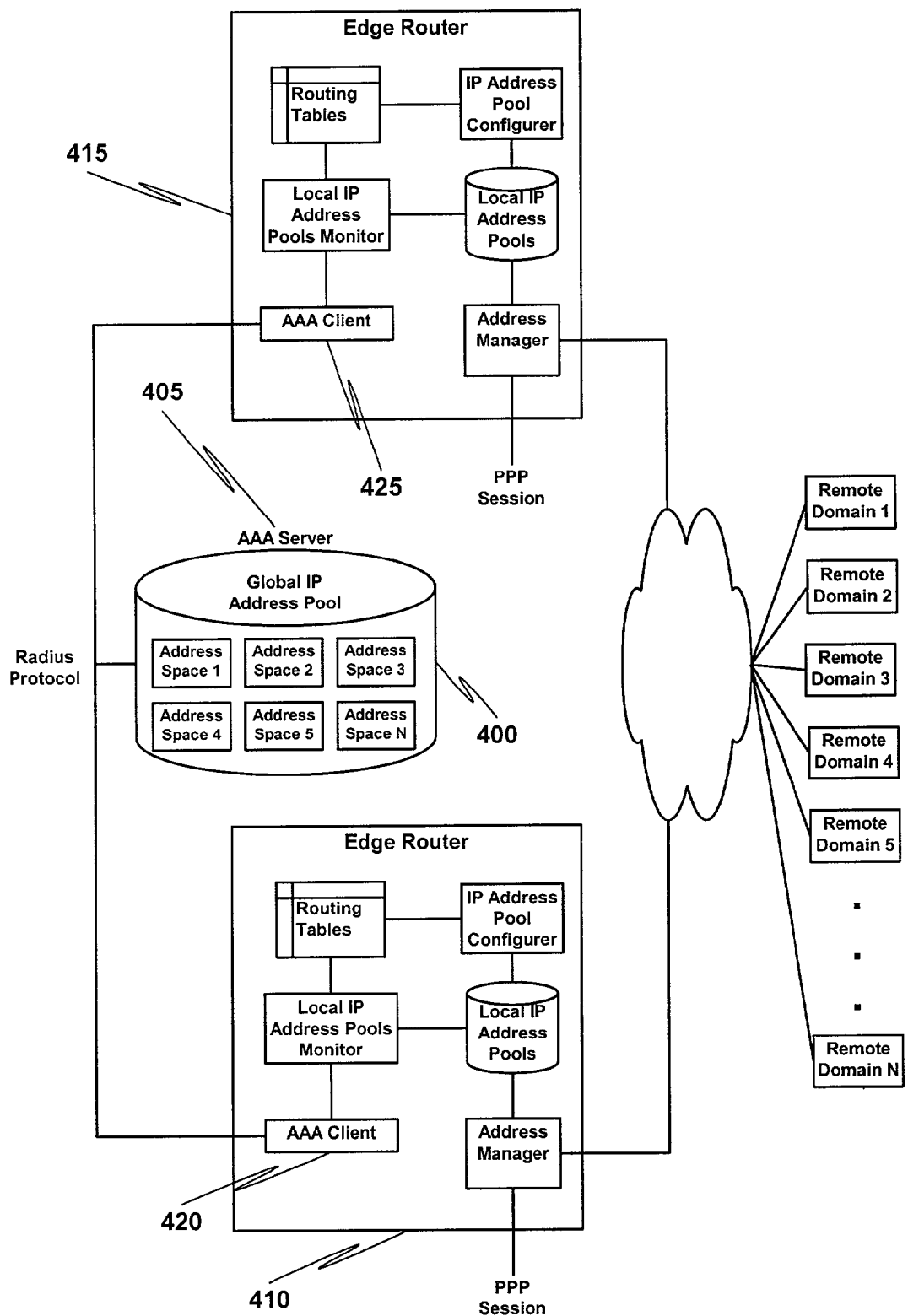
FIG. 4 is a block diagram that illustrates an apparatus for on-demand IP address management using the RADIUS protocol in accordance with one embodiment of the present invention.
Figure 5:
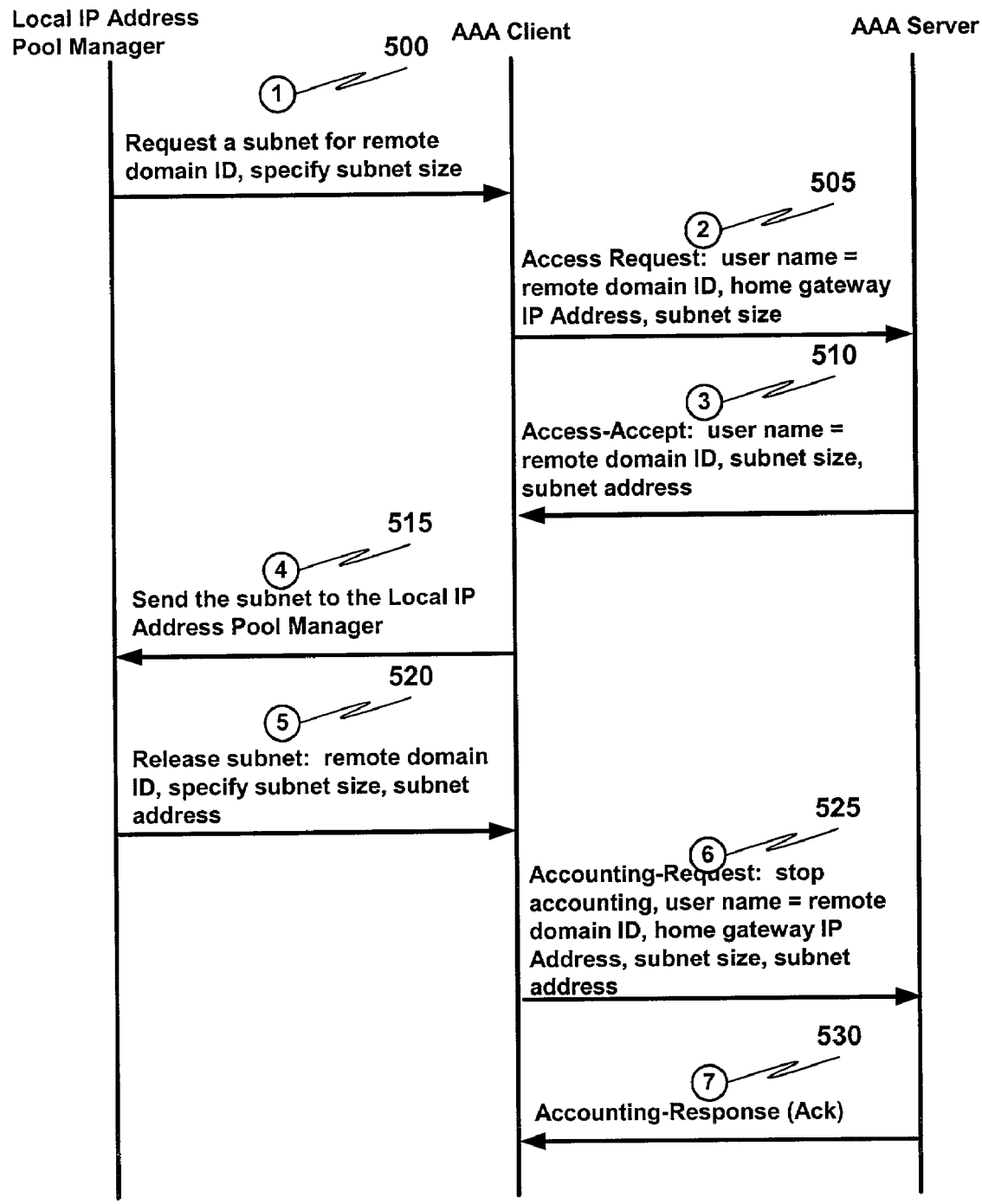
FIG. 5 is a block diagram that illustrates on-demand IP address management in accordance with one embodiment of the present invention.
Figure 6:
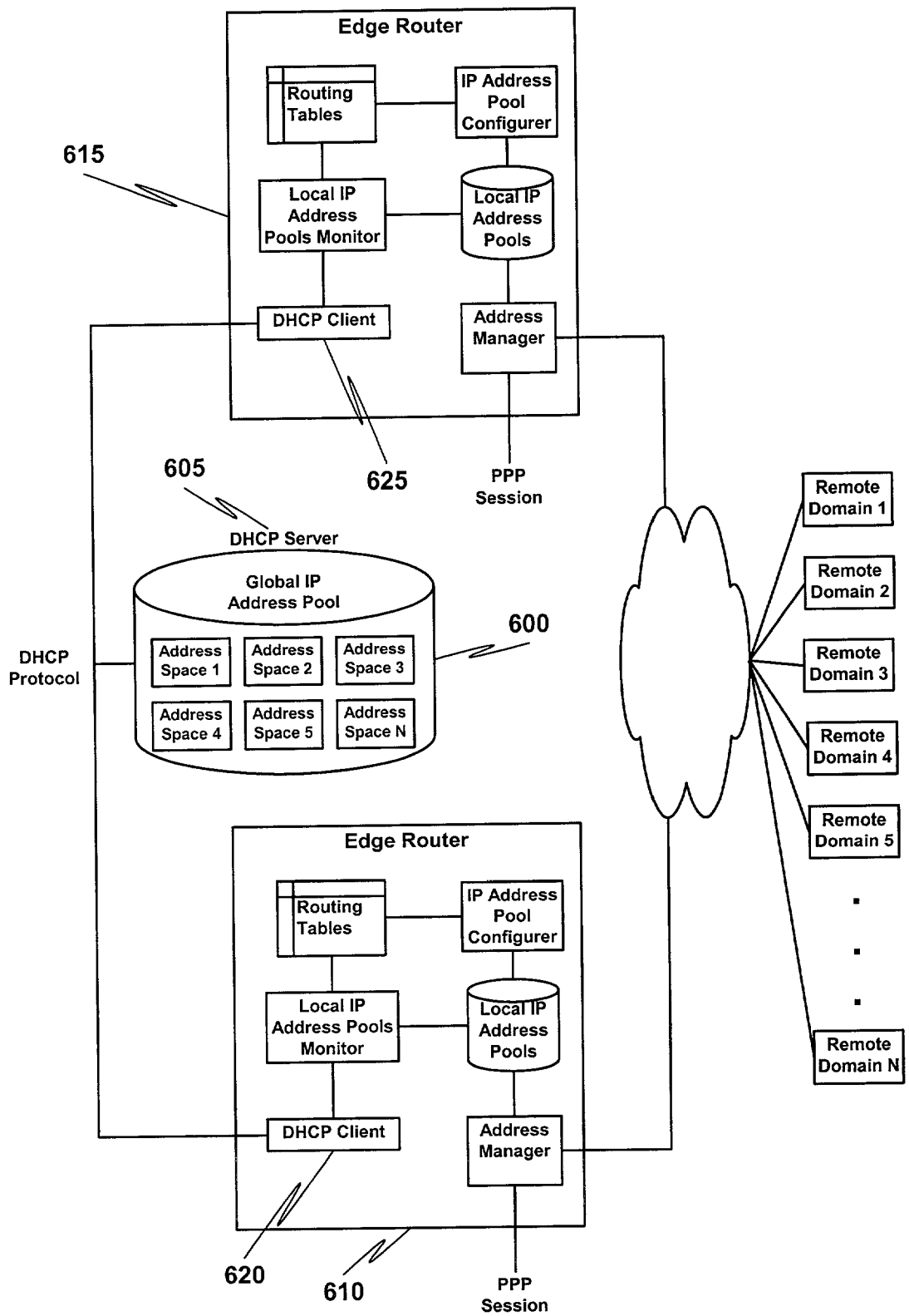
FIG. 6 is a block diagram that illustrates an apparatus for on-demand IP address management using the DHCP protocol in accordance with one embodiment of the present invention.
Figure 7:
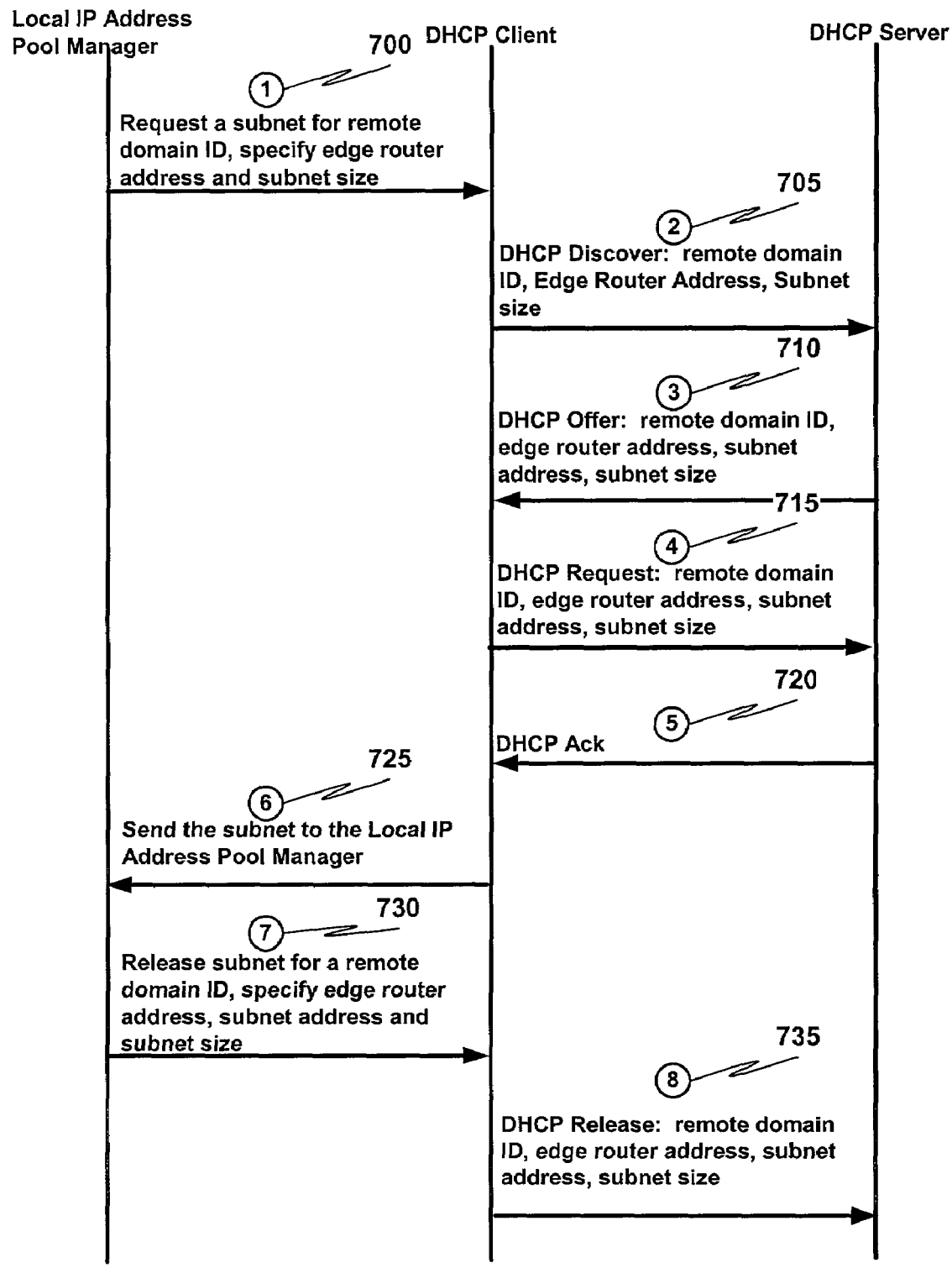
FIG. 7 is a block diagram that illustrates on-demand IP address management in accordance with one embodiment of the present invention.

FIGS. 4 and 5 illustrate on-demand IP address management using the RADIUS protocol. FIGS. 6 and 7 illustrate on-demand IP address management using the DHCP protocol. Those of ordinary skill in the art will realize that other authentication protocols can be used as acceptable authentication communications links between the various communications devices that encompass the data communication network and still be within the inventive concepts disclosed herein.

Turning now to FIG. 4, a block diagram that illustrates an apparatus for on-demand IP address management using the RADIUS protocol in accordance with one embodiment of the present invention is presented. A Global IP address pool 400 is maintained in AAA server 405. Edge routers 410 and 415 communicate with the AAA server 405 via AAA proxies 420 and 425.

Turning now to FIG. 5, a block diagram that illustrates on-demand IP address management in accordance with one embodiment of the present invention is presented. The process used to obtain an additional subnet is illustrated beginning with reference numeral 500. At 500, the local IP address pool manager issues a subnet request. The request includes a remote domain ID, a NAS port and a requested subnet size. At 505, the AAA client receives the request, puts the request in RADIUS format and sends the request to the AAA server. At 510, the AAA server responds with a subnet allocation packet that includes the remote domain ID, NAS port, allocated subnet size and allocated subnet address. At 515, the AAA client receives the subnet allocation packet, extracts the allocated subnet and sends it to the local IP address pool manager.

Still referring to FIG. 5, the process used to release a subnet is illustrated beginning with reference numeral 520. At 520, a packet including the remote domain ID, NAS port, subnet size and subnet address are sent to the AAA client. At 525, the AAA client receives the packet, puts the packet in RADIUS format and sends the subnet release packet to the AAA server. At 530, the AAA server issues an acknowledge packet.

Turning now to FIG. 6, a block diagram that illustrates an apparatus for on-demand IP address management using the DHCP protocol in accordance with one embodiment of the present invention is presented. The global IP address pool 600 is maintained in DHCP server 605. Edge routers 610 and 615 communicate with DHCP server 605 via Ring Access Controller (RAC) clients 620 and 625.

Turning now to FIG. 7, a block diagram that illustrates on-demand IP address management in accordance with one embodiment of the present invention is presented. The process used to obtain a subnet is illustrated beginning with reference numeral 700. At 700, the local IP address pool manager issues a subnet request. The request includes a remote domain ID, edge router address and requested subnet size. At 705, the RAC client receives the request, puts the request in DHCP format and sends a DHCP Discover packet to the DHCP server. Upon receipt of the DHCP discover packet, the DHCP server uses the remote domain ID, edge router address and requested subnet size in the DHCP discover packet to obtain a subnet from the global IP address pool. At 710, the DHCP server responds with a DHCP Offer packet that includes the offered remote domain ID, edge router address, subnet address and subnet size. At 715, the RAC client sends a DHCP request packet that includes the offered remote domain ID, edge router address, subnet address and subnet size. At 720, the RAC client receives an acknowledge packet from the DHCP server. At 725, the RAC client extracts the allocated subnet and sends it to the local IP address pool manager.

Still referring to FIG. 7, the process used to release a subnet is illustrated beginning with reference numeral 730. At 730, a packet including the remote domain ID, edge router address, subnet address and subnet size is sent to the RAC client. At 735, the RAC client receives the packet, puts the packet in DHCP format and sends the DHCP release packet to the DHCP server. Processing continues without waiting for an acknowledgement packet.

Figure 8:
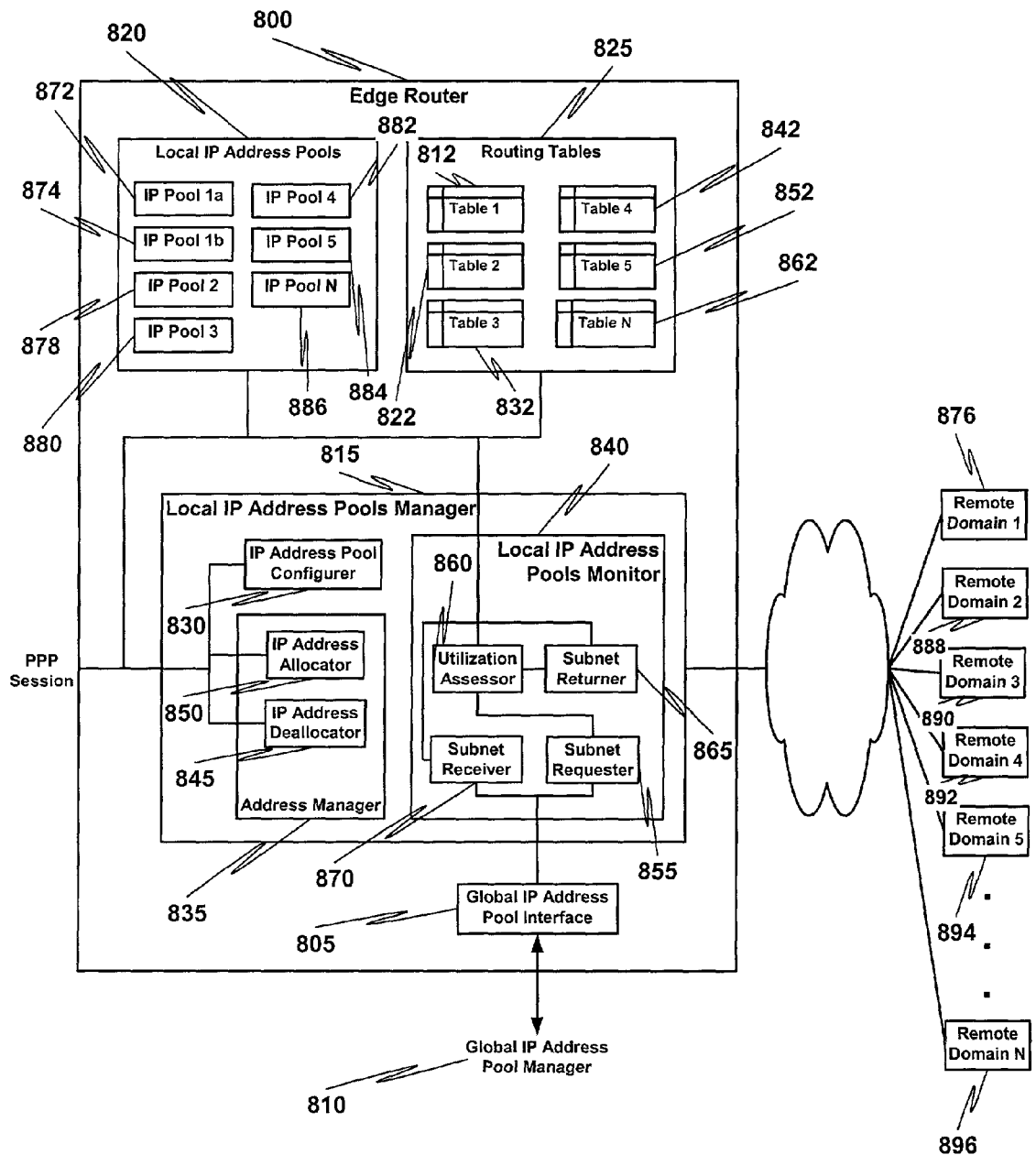
FIG. 8 is a block diagram that illustrates an edge router configured for on-demand IP address management in accordance with one embodiment of the present invention.

Turning now to FIG. 8, a block diagram that illustrates an edge router configured for on-demand IP address management in accordance with one embodiment of the present invention is presented. FIG. 8 provides more detail for reference numerals 300 and 305 of FIG. 3, reference numerals 410 and 415 of FIG. 4, and reference numerals 610 and 615 of FIG. 6. Edge router 800 includes a global IP address pool interface 805 coupled to a global IP address pool manager 810 and a local IP address pools manager 815. The local IP pools manager 815 is coupled to a local IP address pool storage 820 and a routing table storage 825. Local IP address pools manager 815 includes an IP address pool configurer 830, a local IP address manager 835 and a local IP address pools monitor 840. The local IP address manager 835 includes an IP address allocator 850 and an IP address deallocator 845. The local IP address pools monitor 840 includes a subnet requester 855 coupled to the global IP address pool interface 805 and to a utilization assessor 860. The utilization assessor 860 is coupled to a subnet returner 865 and the local IP address pools storage 820. The local IP address pools monitor 840 also includes a subnet receiver 870 coupled to the global IP address pool interface 805, the local IP address pools storage 820 and the routing table storage 825.

Local IP address pools storage 820 includes at least one local IP address pool that is designated for a particular remote domain. As shown in FIG. 8, local IP address pool 1a (872) and 1B (874) are designated for remote domain 1 (876), while local IP address pools 2 (878), 3 (880), 4 (882), 5 (884) and N (886) are designated for remote domains 888, 890, 892, 894 and 896, respectively. Similarly, routing table storage 825 includes at least one routing table that is designated for a particular remote domain. As shown in FIG. 8, routing tables 812, 822, 842, 852 and 862 are designated for remote domains 876, 888, 890, 892, 894 and 896, respectively.

In operation, IP address pool configurer 830 configures at least one local IP address pool and associated routing table. IP address allocator 850 receives a PPP session request. IP address allocator 850 allocates an IP address from the local IP address pool designated for the remote domain being connected to. IP address deallocator 845 releases the IP address when the PPP session ends.

Still referring to FIG. 8, local IP address monitor 840 monitors local IP address pool utilization and attempts to modify the size or number of subnets allocated to a local IP address pool based upon IP address utilization. In more detail, utilization assessor 860 periodically assesses local IP address pool utilization. If IP address pool utilization exceeds a high watermark, utilization assessor interfaces with subnet requestor 855 to request an additional subnet for the overutilized IP address pool. Subnet receiver 870 receives a requested subnet and updates the corresponding local IP address pool and routing table. If IP address pool utilization falls below a low watermark, utilization assessor 860 interfaces with subnet returner 865 to return a subnet, making it available for use by another edge router having an IP address pool associated with the same remote domain.

Figure 9:
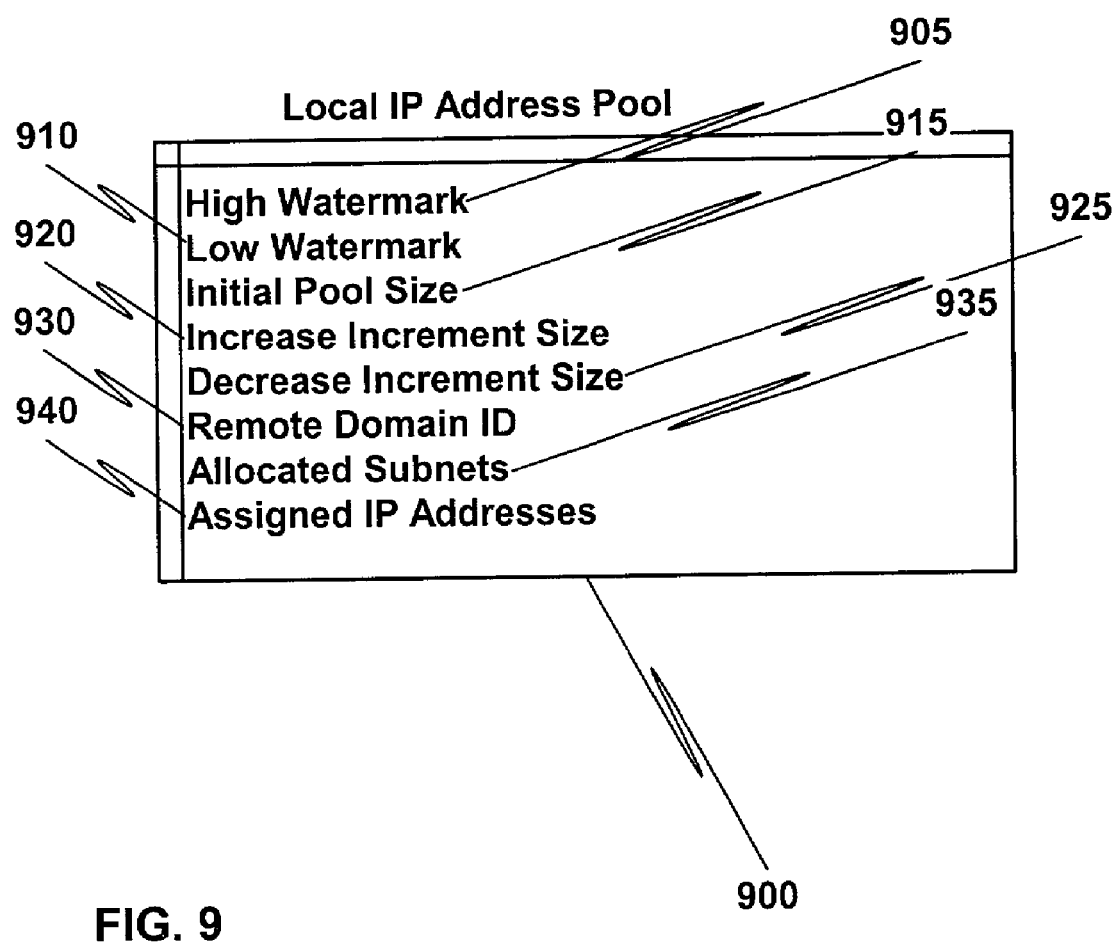
FIG. 9 is a block diagram that illustrates the contents of a local IP address pool in accordance with one embodiment of the present invention.

Turning now to FIG. 9, a block diagram that illustrates the contents of a local IP address pool in accordance with one embodiment of the present invention is presented. The local IP address pool 900 includes the initial pool size 915, a high watermark 905 and a low watermark 910. The high watermark 905 indicates an upper limit on the number of IP addresses in use before another subnet is requested. The low watermark 910 indicates a lower limit on the number of IP addresses in use before a subnet is released.

The local IP address pool also includes an increase increment size 920 and a decrease increment size 925. The increase increment size 920 indicates the number of IP addresses to request when IP address utilization exceeds the high watermark 905. The decrease increment size 925 indicates the number of addresses to release when the IP address utilization falls below the low watermark 910.

The local IP address pool also includes the allocated subnets 935, an indication of which IP addresses are assigned 940 and the remote domain ID 930 associated with the subnets in the local IP address pool.

Figure 10:
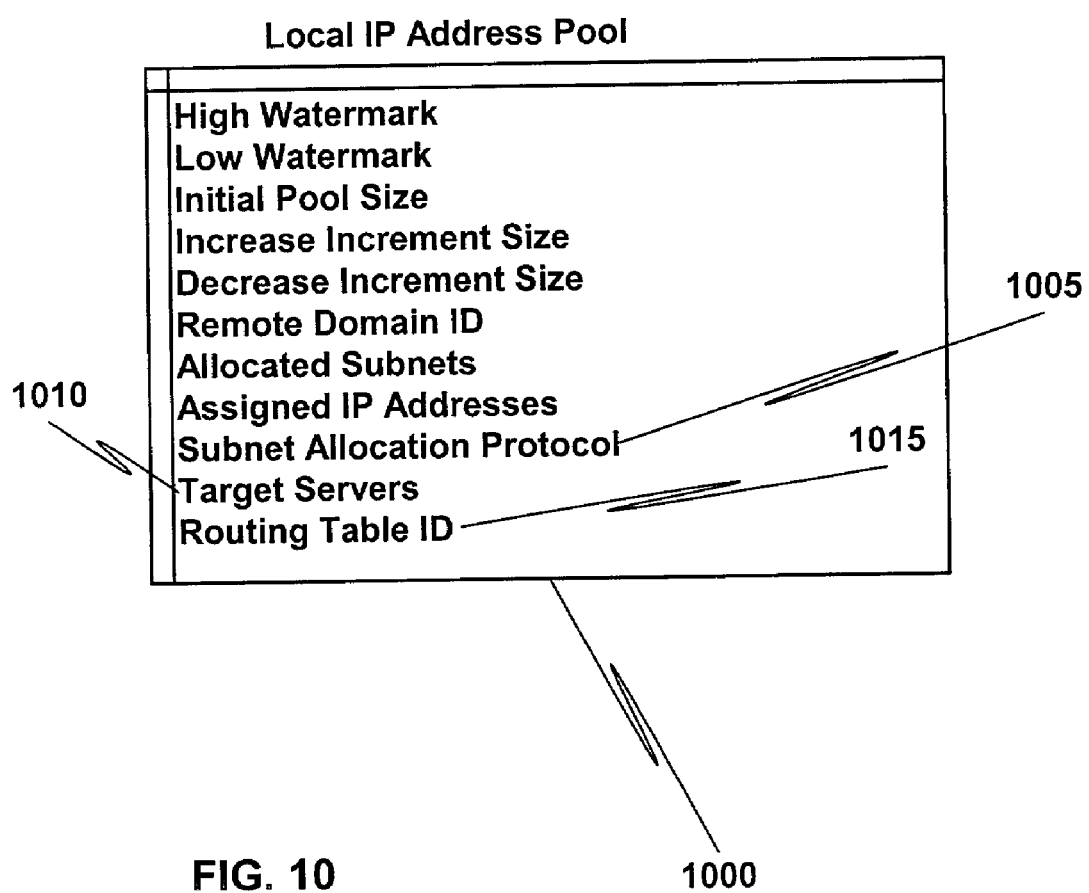
FIG. 10 is a block diagram that illustrates the contents of a local IP address pool in accordance with one embodiment of the present invention.

Turning now to FIG. 10, a block diagram that illustrates the contents of a local IP address pool in accordance with one embodiment of the present invention is presented. The local IP address pool 1000 illustrated in FIG. 10 includes the fields indicated in FIG. 9. Additional fields include the subnet allocation protocol 1005, target servers 1010 and routing table ID 1015. The subnet allocation protocol 1005 may be, by way of example, RADIUS or DHCP. The target servers field 1010 indicates at least one server that includes the global IP address pool. The routing table ID 1015 identifies the routing table designated for the local IP address pool.

Figure 11:
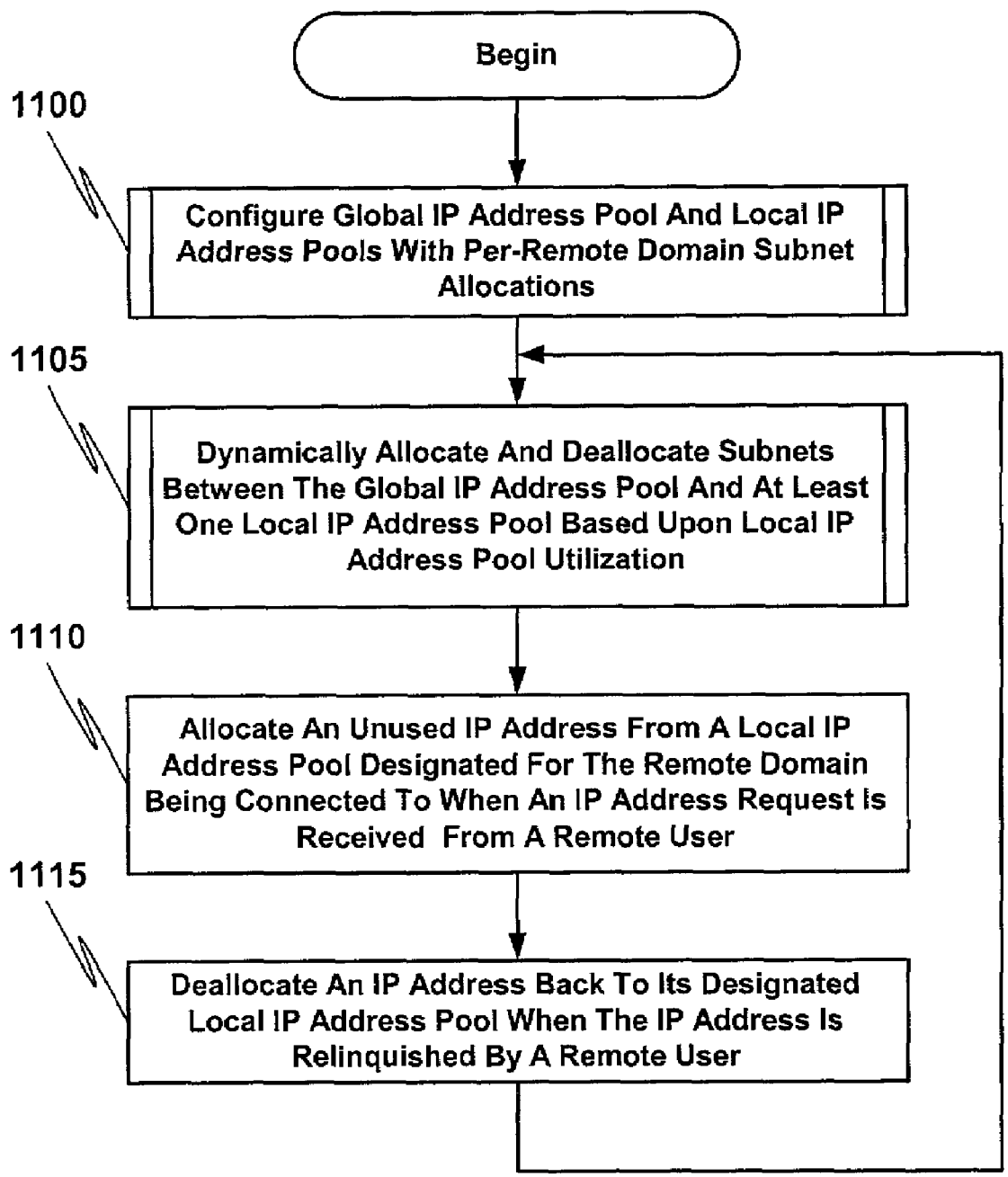
FIG. 11 is a flow diagram that illustrates a method for on-demand IP address management in accordance with one embodiment of the present invention.

Turning now to FIG. 11, a flow diagram that illustrates a method for on-demand IP address management in accordance with one embodiment of the present invention is presented. At 1100, a global IP address pool and at least one local IP address pool are configured with per-remote domain subnet allocations. At 1105, subnets are dynamically allocated between the global IP address pool and at least one local IP address pool based upon local IP address pool utilization. At 1110, an unused IP address is allocated from a local IP address pool designated for a particular remote domain when an IP address request is received from a remote user. At 1115, an IP address is deallocated back to its designated local IP address pool when a remote user relinquishes the IP address. This process of on-demand IP pool management continues at reference numeral 1105.

Those of ordinary skill in the art will readily recognize that the acts listed in the process flow disclosed above do not have to be performed in a lock step manner with each other but may be performed independently. For example, dynamic allocation of subnets (1105) may proceed at a rate independent from the rate at which IP addresses are allocated (1110) or deallocated (1115).

Figure 12:
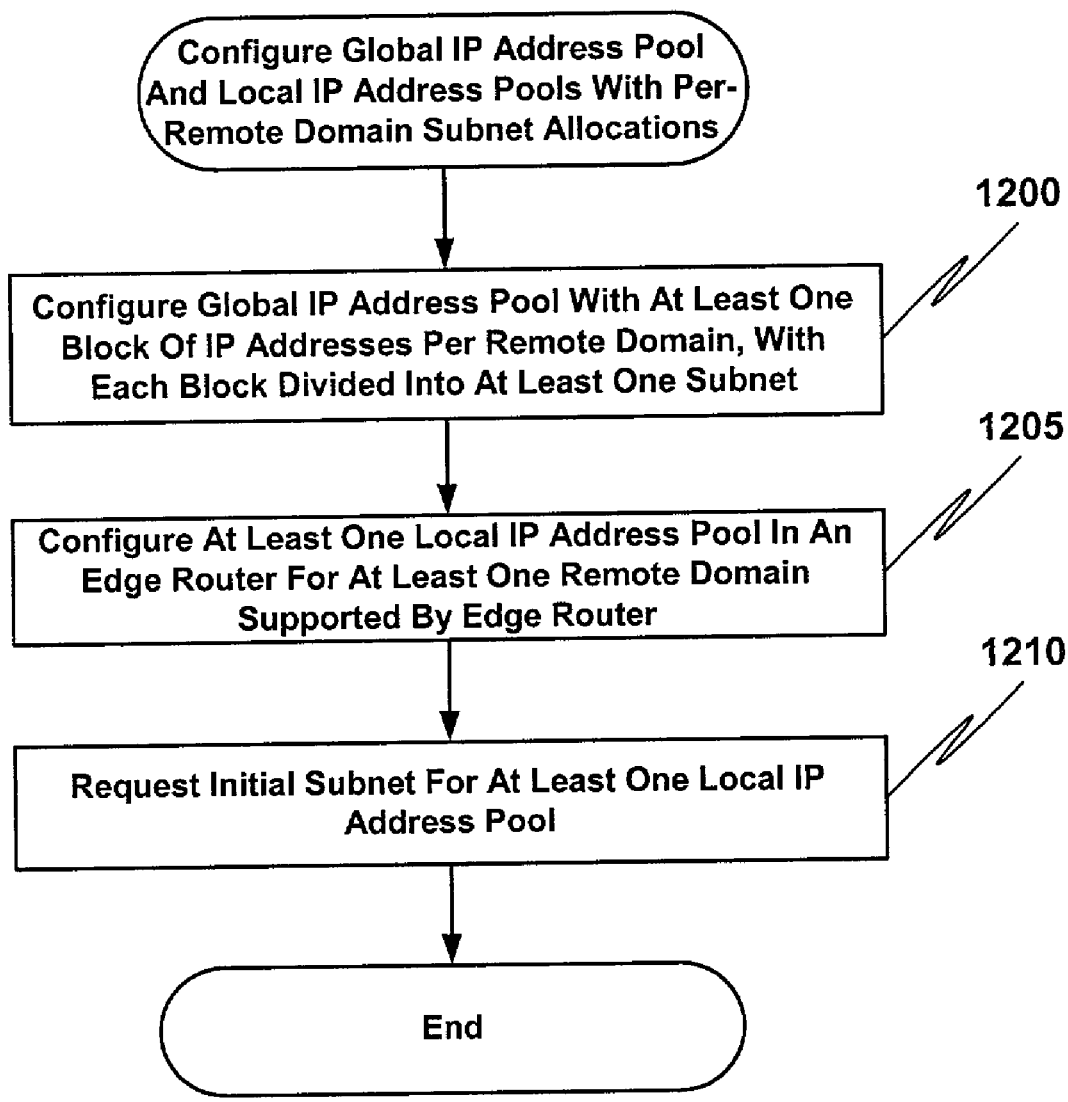
FIG. 12 is a flow diagram that illustrates a method for configuring a global IP address pool and local IP address pools with per-remote domain subnet allocations in accordance with one embodiment of the present invention.

Turning now to FIG. 12, a flow diagram that illustrates a method for configuring a global IP address pool and local IP address pools with per-remote domain subnet allocations in accordance with one embodiment of the present invention is presented. FIG. 12 provides more detail for reference numeral 1100 of FIG. 11. At 1200, the global IP address pool is configured with at least one block of IP addresses per remote domain. Each block includes at least one subnet. At 1205, at least one local IP address pool in an edge router is configured for at least one remote domain supported by the edge router. At 1210, an initial subnet is requested for at least one local IP address pool.

Figure 13:
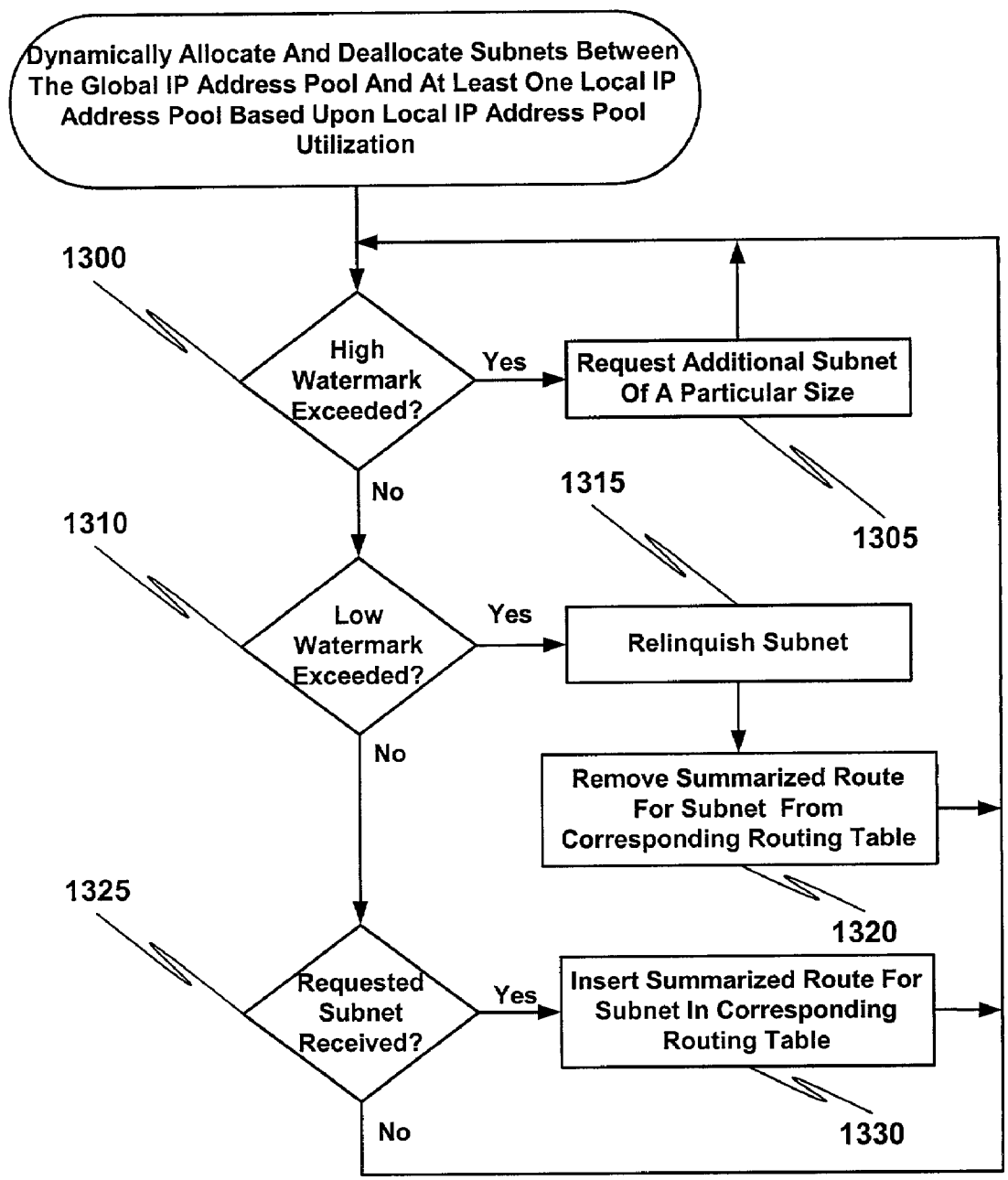
FIG. 13 is a flow diagram that illustrates a method for dynamically allocating and deallocating subnets between a global IP address pool and a local IP address pool based upon local IP address pool utilization in accordance with one embodiment of the present invention.

Turning now to FIG. 13, a flow diagram that illustrates a method for dynamically allocating and deallocating subnets between a global IP address pool and a local IP address pool based upon local IP address pool utilization in accordance with one embodiment of the present invention is presented. FIG. 13 provides more detail for reference numeral 1105 of FIG. 11. At 1300, a determination is made regarding whether a high watermark has been exceeded. If the high watermark has been exceeded, at 1305 an additional subnet is requested. If the high watermark has not been exceeded, at 1310 a determination is made regarding whether a low watermark has been exceeded. If the low watermark has been exceeded, a subnet is relinquished at 1315 and the summarized route for the subnet is removed from the corresponding routing table at 1320. If the low watermark has not been exceeded, at 1325 a determination is made regarding whether a requested subnet has been received. If the requested subnet has been received, at 1330 the summarized route for the subnet is inserted into the corresponding routing table.

According to one embodiment of the present invention, the size of a requested subnet is based upon the initial local IP address pool size. According to another embodiment of the present invention, the size of the requested subnet is based upon the current local IP address pool size. According to another embodiment of the present invention, the size of a requested subnet is predetermined. The size of a released subnet may also be predetermined, relative to the initial local IP address pool size, or relative to the current local IP address pool size.

Figure 14:
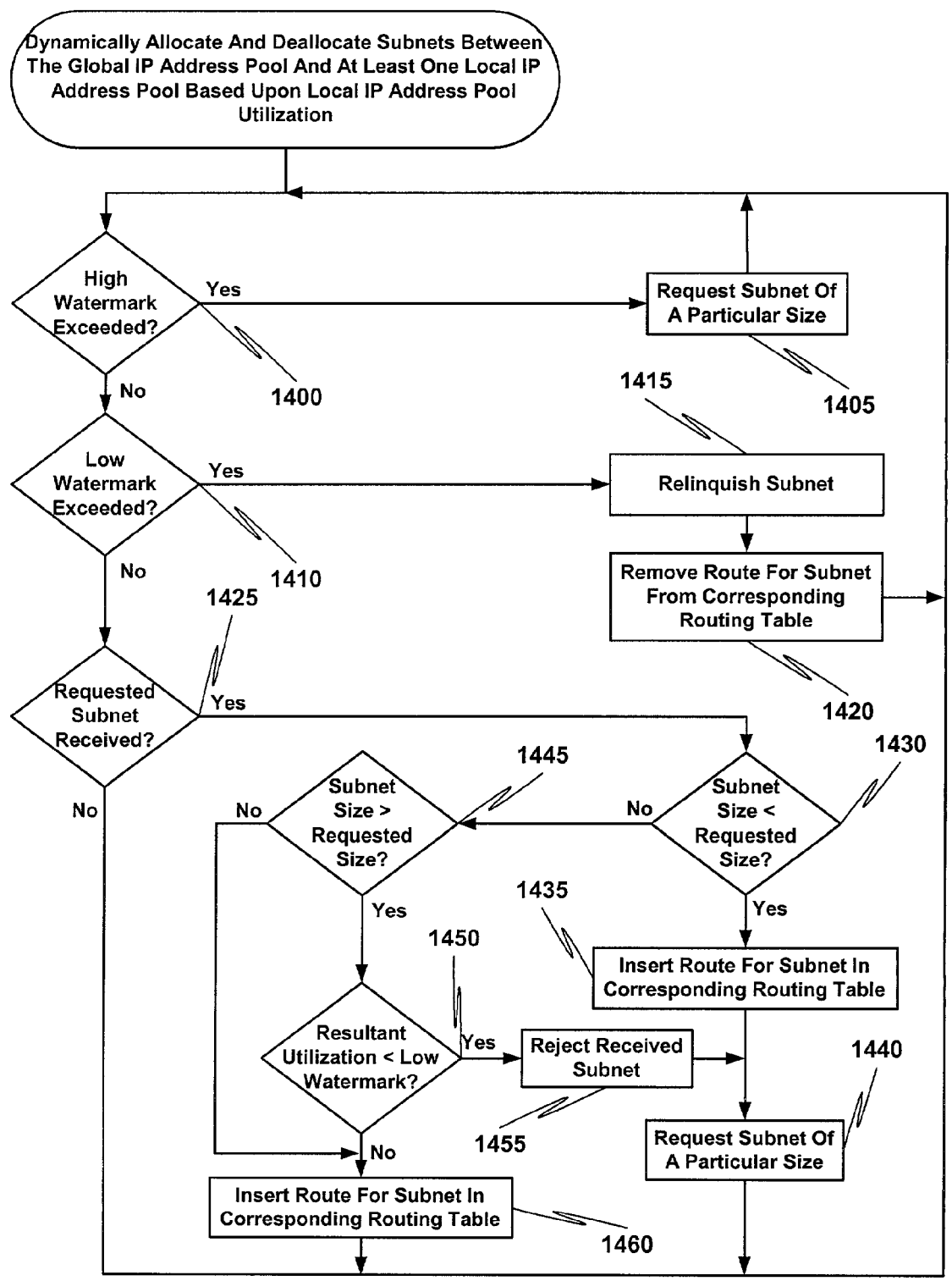
FIG. 14 is a flow diagram that illustrates a method for dynamically allocating and deallocating subnets between a global IP address pool and a local IP address pool based upon local IP address pool utilization in accordance with one embodiment of the present invention.

Turning now to FIG. 14, a flow diagram that illustrates a method for dynamically allocating and deallocating subnets between a global IP address pool and a local IP address pool based upon local IP address pool utilization in accordance with one embodiment of the present invention is presented. FIG. 14 provides more detail for reference numeral 1105 of FIG. 11. FIG. 14 is similar to FIG. 13, except with regard to receiving a requested subnet. When a requested subnet is received, at 1430 a determination is made regarding whether the received subnet size is less than the requested subnet size. If the received subnet size is less than the requested subnet size, a route for the subnet is inserted into the corresponding routing table at 1435 and another subnet is requested at 1440.

If the received subnet size is not less than the requested subnet size, at 1445 a determination is made regarding whether the received subnet size is greater than the requested subnet size. If the received subnet size is greater than the requested subnet size, at 1450 a determination is made regarding whether the resulting local IP address pool utilization is less than the low watermark. If the resulting utilization is less than the low watermark, the received subnet is rejected at 1455 and another subnet is requested at 1440. If the resulting local IP address pool utilization is not less than the low watermark, at 1460 a route for the subnet is inserted in the corresponding routing table.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for on-demand management of Internet Protocol (IP) address pools, the method comprising:
    allocating an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses;
    deallocating an IP address back to said local IP address pool if said IP address is relinquished by a remote user; and
    apportioning one or more of said at least one subnet between said global IP address pool and said local IP address pool based upon utilization of said local IP address pool by requesting one or more subnet from said global IP address pool if utilization of said local IP address pool exceeds a first threshold and releasing one or more subnet to said global IP address pool if utilization of said local IP address pool falls below a second threshold.

2. The method of claim 1, further comprising configuring said local IP address pool with a subnet from said at least one subnet.

3. The method of claim 1 wherein
    requesting one or more subnet from said global IP address pool includes specifying a remote domain ID, a NAS port, and a subnet size and releasing one or more subnet to said global IP address pool includes specifying a remote domain ID, a NAS port, a subnet size and a subnet address.

4. The method of claim 3 wherein said apportioning further comprises polling said local IP address pool at predetermined intervals to obtain local IP address pool utilization information.

5. The method of claim 3 wherein
    said requesting further comprises requesting a subnet having first predetermined number of IP addresses; and
    said releasing further comprises releasing a subnet having a second predetermined number of IP addresses.

6. The method of claim 3 wherein
    said requesting further comprises requesting a subnet having a size that is relative to a current subnet size; and
    said releasing further comprises releasing a subnet having a size that is relative to said current subnet size.

7. The method of claim 3 wherein
    said requesting further comprises requesting a subnet having a size that is relative to an initial subnet size; and
    said releasing further comprises releasing a subnet having a size that is relative to said initial subnet size.

8. The method of claim 3 wherein
    said requesting further comprises requesting a subnet having a predetermined size; and
    said releasing further comprises releasing a subnet having said predetermined size.

9. The method of claim 3 wherein said releasing further comprises removing the summarized route for said one or more subnet from a routing table associated with said local IP address pool.

10. The method of claim 8 wherein said method further comprises inserting a route summary for said requested one or more subnet if said requested one or more subnet is received.

11. The method of claim 8 wherein said method further comprises:
    inserting a route summary for a received one or more subnet and requesting one or more subnet if the size of said received one or more subnet is less than the size of said requested one or more subnet;
    inserting a route summary for said received one or more subnet if the size of said received one or more subnet equals the size of said requested one or more subnet;
    inserting a route summary for said received one or more subnet if the size of said received one or more subnet is greater than the size of said requested one or more subnet and if the resulting local IP address pool utilization falls below said second threshold; and
    rejecting said received one or more subnet and requesting one or more subnet if the size of said received one or more subnet is greater than the size of said requested one or more subnet and if the resulting local IP address pool utilization does not fall below said second threshold.

12. The method of claim 1 wherein said remote domain comprises a virtual private network (remote domain).

13. A program storage device readable by a machine, embodying a program of instructions executable by the machine to perform a method for on-demand management of Internet Protocol (IP) address pools, the method comprising:
    allocating an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses;
    deallocating an IP address back to said local IP address pool if said IP address is relinquished by a remote user; and
    apportioning one or more of said at least one subnet between said global IP address pool and said local IP address pool based upon utilization of said local IP address pool by requesting one or more subnet from said global IP address pool if utilization of said local IP address pool exceeds a first threshold and releasing one or more subnet to said global IP address pool if utilization of said local IP address pool falls below a second threshold.

14. The program storage device of claim 13, said method further comprising configuring said local IP address pool with a subnet from said at least one subnet.

15. The program storage device of claim 13 wherein
    requesting one or more subnet from said global IP address pool includes specifying a remote domain ID, a NAS port, and a subnet size and releasing one or more subnet to said global IP address pool includes specifying a remote domain ID, a NAS port a subnet size and a subnet address.

16. The program storage device of claim 15 wherein said apportioning further comprises polling said local IP address pool at predetermined intervals to obtain local IP address pool utilization information.

17. The program storage device of claim 15 wherein
said requesting further comprises requesting a subnet having first predetermined number of IP addresses; and
said releasing further comprises releasing a subnet having a second predetermined number of IP addresses.

18. The program storage device of claim 15 wherein
said requesting further comprises requesting a subnet having a size that is relative to a current subnet size; and
said releasing further comprises releasing a subnet having a size that is relative to said current subnet size.

19. The program storage device of claim 15 wherein
said requesting further comprises requesting a subnet having a size that is relative to an initial subnet size; and
said releasing further comprises releasing a subnet having a size that is relative to said initial subnet size.

20. The program storage device of claim 15 wherein
said requesting further comprises requesting a subnet having a predetermined size; and
said releasing further comprises releasing a subnet having said predetermined size.

21. The program storage device of claim 15 wherein said releasing further comprises removing the summarized route for said one or more subnet from a routing table associated with said local IP address pool.

22. The program storage device of claim 20 wherein said method further comprises inserting a route summary for said requested one or more subnet if said requested one or more subnet is received.

23. The program storage device of claim 20 wherein said method further comprises:
inserting a route summary for a received one or more subnet and requesting one or more subnet if the size of said received one or more subnet is less than the size of said requested one or more subnet;
inserting a route summary for said received one or more subnet if the size of said received one or more subnet equals the size of said requested one or more subnet;
inserting a route summary for said received one or more subnet if the size of said received one or more subnet is greater than the size of said requested one or more subnet and if the resulting local IP address pool utilization falls below said second threshold; and
rejecting said received one or more subnet and requesting one or more subnet if the size of said received one or more subnet is greater than the size of said requested one or more subnet and if the resulting local IP address pool utilization does not fall below said second threshold.

24. The program storage device of claim 13 wherein said remote domain comprises a virtual private network (remote domain).

25. An apparatus having a processor that performs for on-demand management of Internet Protocol (IP) address pools, the apparatus comprising:
means for allocating an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses;
means for deallocating an IP address back to said local IP address pool if said IP address is relinquished by a remote user; and
means for apportioning one or more of said at least one subnet between said global IP address pool and said local IP address pool based upon utilization of said local IP address pool by requesting one or more subnet from said global IP address pool if utilization of said local IP address pool exceeds a first threshold and releasing one or more subnet to said global IP address pool if utilization of said local IP address pool falls below a second threshold.

26. The apparatus of claim 25, further comprising means for configuring said local IP address pool with a subnet from said at least one subnet.

27. The apparatus of claim 25 wherein
requesting one or more subnet from said global IP address pool includes specifying a remote domain ID, a NAS port, and a subnet size and releasing one or more subnet to said global IP address pool includes specifying a remote domain ID, a NAS port, a subnet size and a subnet address.

28. The apparatus of claim 27 wherein said means for apportioning further comprises means for polling said local IP address pool at predetermined intervals to obtain local IP address pool utilization information.

29. The apparatus of claim 27 wherein
said means for requesting further comprises means for requesting a subnet having first predetermined number of IP addresses; and
said means for releasing further comprises means for releasing a subnet having a second predetermined number of IP addresses.

30. The apparatus of claim 27 wherein
said means for requesting further comprises means for requesting a subnet having a size that is relative to a current subnet size; and
said means for releasing further comprises means for releasing a subnet having a size that is relative to said current subnet size.

31. The apparatus of claim 27 wherein
said means for requesting further comprises means for requesting a subnet having a size that is relative to an initial subnet size; and
said means for releasing further comprises means for releasing a subnet having a size that is relative to said initial subnet size.

32. The apparatus of claim 27 wherein
said means for requesting further comprises means for requesting a subnet having a predetermined size; and
said means for releasing further comprises means for releasing a subnet having said predetermined size.

33. The apparatus of claim 27 wherein said means for releasing further comprises means for removing the summarized route for said one or more subnet from a routing table associated with said local IP address pool.

34. The apparatus of claim 32 wherein said apparatus further comprises means for inserting a route summary for said requested one or more subnet if said requested one or more subnet is received.

35. The apparatus of claim 32 wherein said apparatus further comprises:
means for inserting a route summary for a received one or more subnet and means for requesting one or more subnet if the size of said received one or more subnet is less than the size of said requested one or more subnet;

means for inserting a route summary for said received one or more subnet if the size of said received one or more subnet equals the size of said requested one or more subnet;

means for inserting a route summary for said received one or more subnet if the size of said received one or more subnet is greater than the size of said requested one or more subnet and if the resulting local IP address pool utilization falls below said second threshold; and means for rejecting said received one or more subnet and means for requesting one or more subnet if the size of said received one or more subnet is greater than the size of said requested one or more subnet and if the resulting local IP address pool utilization does not fall below said second threshold.

36. The apparatus of claim 25 wherein said remote domain comprises a virtual private network (remote domain).

37. An apparatus having a processor that performs for on-demand management of Internet Protocol (IP) address pools, the apparatus comprising:
   an allocator to allocate an IP address from a local IP address pool designated for a remote domain if a request to said remote domain is received, said local IP address pool comprising one or more of at least one subnet obtained from a global IP address pool, each of said at least one subnet specifying a contiguous set of one or more IP addresses, said allocator coupled to said local IP address pool;
   a deallocator to deallocate an IP address back to said local IP address pool if said IP address is relinquished by a remote user, said deallocator coupled to said local IP address pool; and
   a monitor to apportion one or more of said at least one subnet between said global IP address pool and said local IP address pool based upon utilization of said local IP address pool, by requesting one or more subnet from said global IP address pool if utilization of said local IP address pool exceeds a first threshold and releasing one or more subnet to said global IP address pool if utilization of said local IP address pool falls below a second threshold, said monitor coupled to said local IP address pool and a global IP address pool interface.

38. The apparatus of claim 37, further comprising an IP address configurer to configure said local IP address pool with a subnet from said at least one subnet.

39. The apparatus of claim 37 wherein said monitor comprises:
   a utilization assessor to assess utilization of said local IP address pool, said utilization assessor coupled to said local IP address pool;
   a subnet requestor to issue a subnet request specifying a remote domain ID, a NAS port, and a subnet size;
   a subnet receiver to receive said subnet request and to forward said subnet request to said local IP address pool, said subnet receiver coupled to said local IP address pool and said global IP address pool interface; and
   a subnet returner to return a subnet to said local IP address pool if said utilization assessor said subnet returner coupled to said local IP address pool and said global IP address pool interface.

40. The apparatus of claim 39 wherein said utilization assessor is further configured to poll said local IP address pool at predetermined intervals to obtain local IP address pool utilization information.

41. The apparatus of claim 39 wherein
   said subnet requestor is further configured to request a subnet having first predetermined number of IP addresses; and
   said subnet returner is further configured to release a subnet having a second predetermined number of IP addresses.

42. The apparatus of claim 39 wherein
   said subnet requestor is further configured to request a subnet having a size that is relative to a current subnet size; and
   said subnet returner is further configured to release a subnet having a size that is relative to said current subnet size.

43. The apparatus of claim 39 wherein
   said subnet requestor is further configured to request a subnet having a size that is relative to an initial subnet size; and
   said subnet returner is further configured to release a subnet having a size that is relative to said initial subnet size.

44. The apparatus of claim 39 wherein
   said subnet requestor is further configured to request a subnet having a predetermined size; and
   said subnet returner is further configured to release a subnet having said predetermined size.

45. The apparatus of claim 39 wherein said subnet returner is further configured to remove the summarized route for said one or more subnet from a routing table associated with said local IP address pool.

46. The apparatus of claim 44 wherein said subnet receiver is further configured to insert a route summary for said requested one or more subnet if said requested one or more subnet is received.

47. The apparatus of claim 44 wherein said subnet receiver is further configured to:
   insert a route summary for a received one or more subnet and requesting one or more subnet if the size of said received one or more subnet is less than the size of said requested one or more subnet;
   insert a route summary for said received one or more subnet if the size of said received one or more subnet equals the size of said requested one or more subnet;
   insert a route summary for said received one or more subnet if the size of said received one or more subnet is greater than the size of said requested one or more subnet and if the resulting local IP address pool utilization falls below said second threshold; and
   reject said received one or more subnet and requesting one or more subnet if the size of said received one or more subnet is greater than the size of said requested one or more subnet and if the resulting local IP address pool utilization does not fall below said second threshold.

48. The apparatus of claim 37 wherein said remote domain comprises a virtual private network (remote domain).

49. The apparatus of claim 37 wherein
   said global IP address pool comprises an Authentication, Authorization and Accounting (AAA) server; and
   said global IP address interface comprises an AAA proxy configured to communicate with said AAA server using the RADIUS protocol.

50. The apparatus of claim 37 wherein
   said global IP address pool comprises a Dynamic Host Configuration Protocol (DHCP) server; and said global IP address interface comprises a Ring Access Controller (RAC) client configured to communicate with said DHCP server using the DHCP protocol.

51. A method for on-demand management of Internet Protocol (IP) address pools, the method comprising:
   allocating an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses;
   deallocating an IP address back to said local IP address pool if said IP address is relinquished by a remote user;
   apportioning one or more of said at least one subnet between said global IP address pool and said local IP address pool based upon utilization of said local IP address pool, said apportioning further comprising:
      requesting one or more subnet from said global IP address pool if utilization of said local IP address pool exceeds a first threshold, said one or more subnet having a size that is relative to a current subnet size; and
      releasing one or more subnet to said global IP address pool if utilization of said local IP address pool falls below a second threshold, said one or more subnet having a size that is relative to said current subnet size;
   inserting a route summary for a received one or more subnet and requesting one or more subnet if the size of said received one or more subnet is less than the size of said requested one or more subnet;
   inserting a route summary for said received one or more subnet if the size of said received one or more subnet equals the size of said requested one or more subnet;
   inserting a route summary for said received one or more subnet if the size of said received one or more subnet is greater than the size of said requested one or more subnet and if the resulting local IP address pool utilization falls below said second threshold; and
   rejecting said received one or more subnet and requesting one or more subnet if the size of said received one or more subnet is greater than the size of said requested one or more subnet and if the resulting local IP address pool utilization does not fall below said second threshold.

52. A program storage device readable by a machine, embodying a program of instructions executable by the machine to perform a method for on-demand management of Internet Protocol (IP) address pools, the method comprising:
   allocating an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses;
   deallocating an IP address back to said local IP address pool if said IP address is relinquished by a remote user;
   apportioning one or more of said at least one subnet between said global IP address pool and said local IP address pool based upon utilization of said local IP address pool, said apportioning further comprising:
      requesting one or more subnet from said global IP address pool if utilization of said local IP address pool exceeds a first threshold, said one or more subnet having a size that is relative to a current subnet size; and
      releasing one or more subnet to said global IP address pool if utilization of said local IP address pool falls below a second threshold, said one or more subnet having a size that is relative to said current subnet size;
   inserting a route summary for a received one or more subnet and requesting one or more subnet if the size of said received one or more subnet is less than the size of said requested one or more subnet;
   inserting a route summary for said received one or more subnet if the size of said received one or more subnet equals the size of said requested one or more subnet;
   inserting a route summary for said received one or more subnet if the size of said received one or more subnet is greater than the size of said requested one or more subnet and if the resulting local IP address pool utilization falls below said second threshold; and
   rejecting said received one or more subnet and requesting one or more subnet if the size of said received one or more subnet is greater than the size of said requested one or more subnet and if the resulting local IP address pool utilization does not fall below said second threshold.

53. An apparatus having a processor that performs for on-demand management of Internet Protocol (IP) address pools, the apparatus comprising:
   means for allocating an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses;
   means for deallocating an IP address back to said local IP address pool if said IP address is relinquished by a remote user;
   means for apportioning one or more of said at least one subnet between said global IP address pool and said local IP address pool based upon utilization of said local IP address pool, said means for apportioning further comprising:
      means for requesting one or more subnet from said global IP address pool if utilization of said local IP address pool exceeds a first threshold, said one or more subnet having a size that is relative to a current subnet size; and
      means for releasing one or more subnet to said global IP address pool if utilization of said local IP address pool falls below a second threshold, said one or more subnet having a size that is relative to said current subnet size;
   means for inserting a route summary for a received one or more subnet and requesting one or more subnet if the size of said received one or more subnet is less than the size of said requested one or more subnet;
   means for inserting a route summary for said received one or more subnet if the size of said received one or more subnet equals the size of said requested one or more subnet;
   means for inserting a route summary for said received one or more subnet if the size of said received one or more subnet is greater than the size of said requested one or more subnet and if the resulting local IP address pool utilization falls below said second threshold; and means for rejecting said received one or more subnet and requesting one or more subnet if the size of said received one or more subnet is greater than the size of said requested one or more subnet and if the resulting local IP address pool utilization does not fall below said second threshold.

54. An apparatus having a processor that performs for on-demand management of Internet Protocol (IP) address pools, the apparatus comprising:

an allocator to allocate an IP address from a local IP address pool designated for a remote domain if a request to connect to said remote domain is received, said local IP address pool comprising one or more of at least one subnet obtained from a global IP address pool, each of said at least one subnet specifying a contiguous set of one or more IP addresses, said allocator coupled to said local IP address pool;

a deallocator to deallocate an IP address back to said local IP address pool if said IP address is relinquished by a remote user, said deallocator coupled to said local IP address pool;

a monitor to apportion one or more of said at least one subnet between said global IP address pool and said local IP address pool based upon utilization of said local IP address pool, said monitor coupled to said local IP address pool and a global IP address pool interface, said monitor comprising:

a utilization assessor to assess utilization of said local IP address pool, said utilization assessor coupled to said local IP address pool;

a subnet requestor to request a subnet from said global IP address pool if utilization of said local IP address pool exceeds a first threshold, said subnet having a size that is relative to a current subnet size;

a subnet receiver to receive said requested subnet and to forward said requested subnet to said local IP address pool, said subnet receiver coupled to said local IP address pool and said global IP address pool interface, said subnet having a size that is relative to said current subnet size, said subnet receiver configured to:

insert a route summary for a received one or more subnet and requesting one or more subnet if the size of said received one or more subnet is less than the size of said requested one or more subnet;

insert a route summary for said received one or more subnet if the size of said received one or more subnet equals the size of said requested one or more subnet;

insert a route summary for said received one or more subnet if the size of said received one or more subnet is greater than the size of said requested one or more subnet and if the resulting local IP address pool utilization falls below said second threshold; and reject said received one or more subnet and requesting one or more subnet if the size of said received one or more subnet is greater than the size of said requested one or more subnet and if the resulting local IP address pool utilization does not fall below said second threshold; and a subnet returner to return a subnet to said local IP address pool if said utilization assessor indicates utilization of said local IP address pool is below a second threshold, said subnet returner coupled to said local IP address pool and said global IP address pool interface.

* * * * *